Dec. 22, 1959
R. E. FRICKS
2,918,525
BLANKING CIRCUIT
Filed June 24, 1953
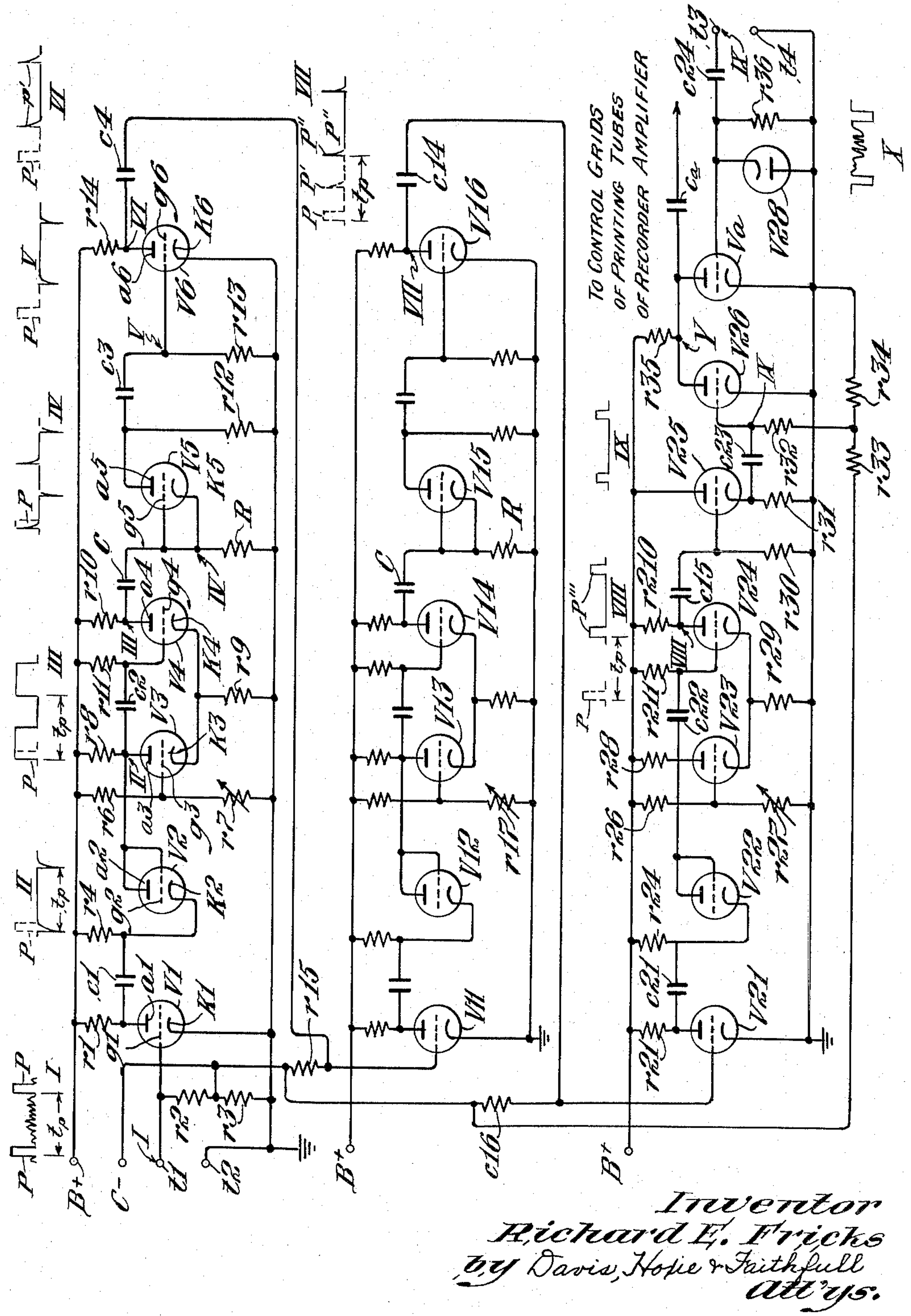
Inventor
Richard E. Fricks
by Davis, Hoxie & Faithfull
Att'ys.

United States Patent Office 2,918,525

Patented Dec. 22, 1959

2,918,525

BLANKING CIRCUIT

Richard E. Fricks, East Weymouth, Mass., assignor to Alden Products Company, Brockton, Mass., a corporation of Massachusetts Application June 24, 1953, Serial No. 363,899

11 Claims. (Cl. 178—6.6)

In modern facsimile systems it is the practice periodically to transmit to the recorder a synchronizing signal in the form of pulses having a greater amplitude than any of the peaks of the facsimile signal itself. Where the conventional negative modulation is used, the synchronizing pulses appear as a "blacker than black" vertical band in the copy unless some means are used to eliminate it. Heretofore this has been accomplished by timing the pulses with respect to the remainder of the signal so that when the recorder is in phase with the transmitter the vertical band is at the end of the scanning lines at the extreme right hand side of the copy. By making the helical electrode of less than a full turn about the recorder drum, no copy is printed at the ends of the scanning lines so that the black band resulting from the synchronizing pulses is eliminated from the copy. Although facsimile systems operating as described above have been and are working successfully at low and moderate speeds, it has been found that a helical recorder electrode of short length, particularly when operated at higher speeds, has a tendency to cause the associated blade electrode periodically to leave the surface of the recording paper or "bounce" which results in inferior copy unless special precautions are taken with the mechanical construction of both electrodes.

It is accordingly the objects of the present invention to provide a signal blanking circuit for use with a facsimile recorder which will blank out a vertical band of copy of a facsimile record, which is particularly adapted for eliminating the band resulting from synchronizing pulses or regularly occurring interference, which is entirely automatic in operation, can be used with existing scanners, recorders and transmission links without modification thereof, which is located at the recorder end of a facsimile system, which can be used selectively to delete information transmitted to one of a group of recorders, and which advances the art generally.

A blanking circuit according to my invention comprising a time delay network including, for example, a multivibrator for initiating auxiliary pulses which are synchronized with but chronologically displaced by a selected amount from periodically occuring incoming signal pulses, such as facsimile synchronizing or framing pulses. The network is interconnected with the amplifier which amplifies the incoming signal to the facsimile recorder so that no signal reaches the recorder during a portion of each scanning line, the relative position of which is a function of the chronological displacement between the auxiliary pulses and the corresponding initiating signal pulses. Preferably, this blanking of the recorder amplifier is accomplished by blanking pulses obtained, for example, by a pulse generator, such as a normally quiescent multibrator, which is activated by the auxiliary pulses from the multivibrator of the time delay circuit. In a preferred embodiment the blanking pulses are applied to the control grid of a vacuum tube in opposition to the grid bias, normally cutting off the tube so that the tube conducts only during the duration of the pulses. The tube anode is connected to a direct power source by a common resistor which is also the load in the anode circuit of a normally conducting amplifier tube in one of the stages of the recorder amplifier, so that, when the former vacuum tube conducts, the anode voltage of the latter tube is reduced by the voltage drop across the resistor to a value at which the latter tube no longer conducts, thus cutting off the stage and the power to the recorder.

These and other objects and aspects of the invention will be apparent from the following description which refers to a drawing wherein the single figure is a wiring diagram of the embodiment of the invention which is presently preferred.

In the drawing, *t1* and *t2* are the input terminals of a time delay network comprising a vacuum tube V1 whose anode *a1* is connected to the positive terminal B+ of a conventional direct power supply (not shown) by a load resistor *r1*. The cathode *k1* of the tube V1 is directly linked to ground, a cut-off bias being applied to the control grid *g1* by means of a bleeder resistor consisting of the resistors *r2* and *r3* which are connected in series between the input terminals *t1* and *t2*, the C voltage being impressed upon an intermediate point of the bleeder resistor from the direct power supply input terminal designated C—. The anode *a1* of the tube V1 is also connected to the cathode *k2* of a second vacuum tube V2 by means of a coupling capacitor *c1*, the common junction of the capacitor and the cathode *k2* being linked to the power supply terminal B+ by a resistor *r4*. The anode *a2* and the control grid *g2* are interconnected so that the tube V2 acts as a diode rectifier, the anode of which is connected directly to the anode *a3* of a third vacuum tube V3.

The control grid *g3* of the tube V3 is connected to the intermediate point of a bleeder resistor consisting of the resistors *r6* and *r7* which are connected in series between the B+ terminal and ground. The latter resistor *r7* is made adjustable for a purpose which will appear hereinafter. The anode *a3* of the tube V3 is also connected to the B+ terminal by a load resistor *r8*. The cathode *k3* of the tube V3 and the cathode *k4* of a vacuum tube V4 are connected to ground by means of a common cathode resistor *r9*. The anode *a4* of the tubeV4 is connected to the B+ power supply terminal by a load resistor *r10*.

The vacuum tubes V3 and V4 operate in conjunction with one another to form a normally quiescent multivibrator, the anode *a3* being connected by means of a capacitor *c2* with the control grid *g4* of the tube V4 which is normally maintained at a slightly positive potential by a resistor *r11*. The anode *a4* of the tube V4 is linked to both the control grid *g5* and the cathode *k5* of a triode vacuum tube V5 by means of a capacitor C. The common terminal of the capacitor C, the control grid *g5* and the cathode *k5* are connected to the grounded terminal *t2* by means of a resistor R, the capacitor and the resistor forming a series RC circuit whose function will appear hereinafter. The anode *a5* of the tube V5 is connected to the control grid *g6* of a vacuum tube V6 by means of a coupling capacitor *c3* and a resistor *r12*. The control grid *g6* is connected to ground by a resistor *r13*. Direct voltage for the anode *a6* of the tube V6 is furnished through a resistor *r14* which interconnects the tube anode with the direct power supply terminal B+. The cathode *k5* is directly linked to ground.

The operation of the above described time delay network can best be understood by reference to the various diagrams which are characterized in the drawing by Roman numerals and which represent the variations as a function of time of the potentials with respect to ground appearing at respective junctions in the wiring diagram identified by corresponding numerals. The time delay network operates as follows: In the absence of an input signal at the terminals *t1* and *t2* the tube V1 is normally cut off by a sufficiently negative voltage obtained from the terminal C—. When an incoming signal, for example from a facsimile transmitter, such as is indicated by the diagram "I," is impressed across the terminals *t1* and *t2*, only the periodic framing or synchronizing pulses *p* are of sufficient magnitude to drive the grid *g1* positive enough so that the tube V1 conducts. The values of the resistors *r2* and *r3* are so proportioned that the facsimile signals interposed between successive synchronizing pulses *p* are not of sufficient amplitude to overcome the large negative bias impressed upon the grid *g1* so that the tube V1 only conducts in response to the occurrence of a synchronizing pulse. When the tube V1 conducts, the voltage drop across its load resistor *r1* causes the cathode *k2* to become negative with respect to the anode *a2* so that the tube V2 conducts to impress upon the anode *a3* a negative signal. As is shown in diagram II, this negative pulse is greater in amplitude and occurs substantially simultaneously with the initiating pulse *p*.

As mentioned heretofore, the tubes V3 and V4 comprise a cathode-coupled multivibrator in which the tube V3 is normally cut off and the tube V4 is normally conducting so that the voltage drop across the resistor *r10* lowers the anode circuit potential of the junction III to a very low positive value. The multivibrator remains in the above stable condition until a negative pulse is impressed upon the anode *a3* of the tube V3 in a manner which has been discussed in detail heretofore. This negative pulse is also impressed upon the grid *g4* of the conducting tube V4 through the coupling capacitor *c2* so that the tube V4 cuts off. The resulting decrease in the flow of current through the common cathode resistor *r9* causes the potential of the cathode *k3* to become less positive relatively to the control grid *g3* so that the tube V3 conducts. The cessation of current flow through the tube V4 also causes the anode potential at the junction III to increase very rapidly until it reaches the voltage of the B+ terminal. The tube V4 remains cut off until the potential upon its control grid *g4* with respect to the cathode *k4* rises above the critical cut off value as the capacitor *c2* discharges through the resistor *r11*, whereupon the tube again conducts. The resumption of the flow of current through the tube V4 has two effects: (1) the increase in the voltage drop across the cathode resistor *r9* causes the cathode *k3* of the tube V3 to become relatively more positive with respect to its control grid *g3*, cutting off the tube V3 to return the multivibrator to its original quiescent state; and (2) the voltage at the junction III becomes less positive due to the voltage drop across the load resistor *r10* thereby to form the trailing edge of a long positive voltage pulse whose duration is equal to the period during which the tube V4 is cut off. The length of time that the tube V4 is cut off and therefore the length of the positive output pulse of the multivibrator, is adjustable within limits by varying the bias potential upon the tube V3 by means of the variable resistor *r7*. It will be apparent that the more positive the bias on the tube V3 the greater the anode voltage change caused by the negative input pulse and the greater the voltage that is impressed across the capacitor *c2*, so that the elapsed time required for the voltage upon the control grid *g4* of the tube V4 to reach the cut off point is correspondingly increased. Conversely, a more negative voltage relative to cathode on the tube V3 results in a smaller voltage change across capacitor *c2* and a corresponding decrease in the elapsed time required to reach the cut off point of the control electrode *g4* of the tube V4 so that the resulting pulse at III has a shorter duration.

The above described auxiliary pulses from the multivibrator appearing at the junction III are impressed upon the RC circuit, including the resistor R and the capacitor C, resulting in a series of short sharp pulses, such as are shown in the diagram IV, appearing across the resistor R. The positive pulses are eliminated by the rectifying action of the tube V5 so that a series of negative pulses, such as are shown in the diagram designated V, are impressed upon the control grid *g6* of the vacuum tube V6. Due to the absence of bias upon the control grid *g6*, the tube V6 is normally conducting so that it is temporarily cut off as succeeding pulses drive the grid negative, during which the voltage of the anode rises in a series of positive output pulses, shown in diagram VI. These pulses occur in synchronism with the initiating facsimile framing pulses *p*, but are delayed so as to follow the corresponding framing pulses by a time period equal to the width of the auxiliary pulses from the multivibrator shown in diagram III.

The positive output pulses *p'* from the output of the above described circuit are impressed upon the control grid of a tube V11 which is normally biased to cut off by a bleeder resistor consisting of the resistors *r15* and *r3* whose common junction is connected to the C— terminal. The vacuum tubes V11 to V16 are connected and function in a similar manner to the tubes V1 to V6, which was described in detail heretofore, so that each of the positive pulses *p''* appearing at the anode of the tube V16, as is shown in diagram VII, lag the pulses *p'*. When the above described time delay networks are to be used with a facsimile system wherein the framing pulses *p* occur at a rate of sixty cycles per second a delay of 8,000 microseconds can be obtained from each of the above described networks so that each pulse *p''* coincides with the framing pulse immediately succeeding the framing pulse *p* which initiated the pulse *p''*. Although it is possible to obtain a time delay equal to the period *tp* of the synchronizing pulses *p*, I prefer both for stability and ease of adjustment to divide the delay period into at least two steps as described in detail above.

The delayed positive pulses *p''* are impressed by means of the coupling capacitor *c14* upon the control grid of a tube V21 which is negatively biased by the resistors *r16* and *r3* from the C— terminal. It will be apparent from the wiring diagram that the vacuum tubes V21, V22, V23 and V24 are connected in analogous manner to the tubes V1 to V4 so that when a positive pulse *p''* is impressed upon the control grid of the tube V21 a long positive pulse *p'''* appears on the anode of the tube V24 as is shown in diagram VIII. The width of this long pulse *p'''* can be varied by changing the value of a variable resistor *r27* in a manner analogous to that described with respect to the previously mentioned multivibrators. The values of the capacitor *c15* and the resistor *r30* are chosen so that the positive pulses from the tube V24 are impressed without appreciable distortion upon the control grid of a tube V25. A resistor *r31* in the cathode circuit of the tube V25 in turn impresses corresponding positive pulses of lesser amplitude (diagram IX) upon the control grid of the tube V26 by means of a capacitor *c23*. The control grid also has applied thereto by means of resistors *r32*, *r33* and *r34* a negative bias which normally cuts the tube V26 off in the absence of the above mentioned positive pulses.

The anode of the tube V26 is connected to the B+ terminal by means of a load resistor *r35* which is also the common load resistor in the anode circuit of a tube V*a* of one stage of the amplifier for the facsimile recorder. The recorder and the remainder of the amplifier being conventional in construction and forming no part of the present invention have not been shown.

Facsimile signals, which are above ground potential but have a negative sense, i.e., an increase in amplitude causes the signal to come nearer to ground potential, (diagram X) are introduced at the terminals *t3* and *t4*, for example from the preceding stage of the recorder amplifier, and are impressed across the control grid and cathode of the amplifier tube V*a* by a capacitor *c*24 and a resistor *r*36. The control grid is clamped by means of a diode V28 to insure that no negative bias can be applied thereto to cut the tube off. In the absence of bias the tube V*a* is always conducting and an increase in amplitude of the facsimile signal X drives its control grid relatively more negative so that the current passed through the tube causes a rise in the potential of the anode circuit point Y under normal operation when the tube V26 is cut off. Conversely, a decrease in amplitude of the signal X causes a greater current flow through the tube V*a* so that the potential of point Y becomes more negative with respect to ground. These variations of potential are applied to the control grids of the printer tubes (not shown) of the recorder amplifier to cause corresponding variations of the current to the recorder printing electrodes.

It will be evident that when the tube V26 conducts due to the impressing of a positive pulse upon its control grid, the voltage drop across the resistor *r*35 will also cause the potential at point Y to become more negative. This is the same result obtainable when the current flow through the tube V*a* is at a maximum due to a minimum amplitude signal upon its grid. In other words, a positive pulse upon the control grid of the tube V26 impresses an equivalent signal upon the grids of the recorder amplifier printer tubes as a minimum amplitude signal on the grid of the tube V*a* so that the same result is obtained in either case, i.e., no current flows in the circuit of the recorder printing electrodes.

This result is used to eliminate the printing of the "blacker than black" framing or synchronizing pulses *p*. The time delay networks are adjusted by means of resistors *r*7 and *r*17 so that the chronological displacement of the final auxiliary pulse *p''* is equal to the period *tp* of the framing pulses thus delaying each auxiliary pulse *p''* long enough so that it coincides with the sequential framing pulse *p* to the initiating framing pulse. The auxiliary pulses *p''* trip the pulse generating multivibrator including the tubes V23 and V24. The width of the resulting blanking pulses *p'''* is adjusted by means of the resistor *r*27 to equal or be slightly greater than the width of the synchronizing pulses *p* so that the recorder amplifier is blocked during the occurrence of the framing pulses which are therefore not printed.

It is to be understood, however, that the above described circuit is not limited in its use to the blanking of the framing pulses, but is equally applicable for the elimination of streaks or vertical bands in facsimile copy due to regularly re-occurring interference or other causes. It may also be used to delete a portion of the record as when the facsimile system is used for business purposes during which a form, such as an order, is transmitted simultaneously to several recorders. In such a case it is often desirable to eliminate the price or other information from the shop and shipping copies. The above circuits are ideally adapted for this purpose.

It should be understood that the present disclosure is for the purpose of illustration only and that this invention includes all modifications and equivalents which fall within the scope of the appended claims.

I claim:

1. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network excited by the framing pulses to initiate output pulses synchronized with the occurrence of and chronologically displaced with respect to the framing pulses, said network including adjustable means for varying the relative chronological displacement between corresponding auxiliary and framing pulses, a pulse generator connected to said network and activated by the output pulses to produce corresponding blanking pulses, and an interconnecting circuit between the pulse generator and the amplifier for applying the blanking pulses to the cut-off potential means for the amplifier so that no signal reaches the recorder during a portion of each scanning line whereby the recorder deletes a band of copy whose transverse position with respect to the length of the scanning lines is determined by the chronological displacement between the network output pulses and the corresponding framing pulses as fixed by the adjustable means.

2. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network excited by the framing pulses to initiate auxiliary pulses which are synchronized with the occurrence of the respective framing pulses, a pulse generator connected to said network and activated by the trailing edge of the auxiliary pulses to produce corresponding blanking pulses which occur subsequent to the corresponding framing pulses by a chronological interval equal to the period of the auxiliary pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses.

3. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network including a normally quiescent multivibrator excited by the framing pulses to initiate auxiliary pulses which are synchronized with the occurrence of the respective framing pulses, a pulse generator connected to said network and activated by the trailing edge of the auxiliary pulses to produce corresponding blanking pulses which occur subsequent to the corresponding framing pulses by a chronological interval equal to the period of the auxiliary pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses.

4. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network including a normally quiescent multivibrator excited by the framing pulses to initiate auxiliary pulses of relatively longer duration which are synchronized with the occurrence of the respective framing pulses, an attenuating circuit energized by the trailing edge of the auxiliary pulses for forming output pulses chronologically displaced with respect to the framing pulses by an interval corresponding to the period of the auxiliary pulses, a pulse generator connected to said attenuating circuit and activated by the output pulses to produce corresponding blanking pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses.

5. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network including a normally quiescent multivibrator excited by the framing pulses to initiate auxiliary pulses of relatively longer duration which are synchronized with the occurrence of the respective framing pulses, an attenuating circuit including a series connected resistor and capacitor energized by the trailing edge of the auxiliary pulses for forming output pulses chronologically displaced with respect to the framing pulses by an interval corresponding to the period of the auxiliary pulses, a pulse generator connected to said attenuating circuit and activated by the output pulses to produce corresponding blanking pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses.

6. An electronic signal blanking circuit according to claim 5 wherein is included at least one additional multivibrator and associated attenuating circuit is interposed between the first attenuating circuit and the pulse generator whereby each additional multivibrator is operated by the auxiliary pulses from the preceding attenuating circuit to further increase the chronological displacement between the initiating framing pulses and auxiliary pulses from the last attenuating circuit which activate the pulse generator.

7. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network including a normally quiescent multivibrator excited by the framing pulses to initiate auxiliary pulses which are synchronized with the occurrence of the respective framing pulses, said multivibrator including adjustable means for varying the duration of the auxiliary pulses, an attenuating circuit energized by the trailing edge of the auxiliary pulses for forming output pulses chronologically displaced with respect to the framing pulses by an interval corresponding to the period of the auxiliary pulses, a pulse generator connected to said attenuating circuit and activated by the output pulses to produce corresponding blanking pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses as fixed by the adjustable means of the multivibrator.

8. An electronic signal blanking circuit for use with a facsimile recorder comprising an amplifier for impressing upon the recorder a facsimile input signal including periodically reoccurring framing pulses such as are used for scanning line synchronizing, said amplifier including means for applying a cut-off potential to one stage thereof during which no signal reaches the recorder, an electrical network including a normally quiescent multivibrator excited by the framing pulses to initiate auxiliary pulses of relatively longer duration which are synchronized with the occurrence of the respective framing pulses, an attenuating circuit energized by the trailing edge of the auxiliary pulses for forming output pulses chronologically displaced with respect to the framing pulses by an interval corresponding to the period of the auxiliary pulses, a pulse generator connected to said attenuating circuit and activated by the output pulses to produce corresponding blanking pulses, said pulse generator being adjustable to vary the period of the blanking pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses, the width of the band being fixed by the period of the blanking pulses as determined by the adjustment of the pulse generator.

9. An electronic signal blanking circuit for use with a facsimile recorder comprising an amplifier for impressing upon the recorder a facsimile input signal including periodically reoccurring framing pulses such as are used for line synchronizing, said amplifier including means for applying a cut-off potential to one stage thereof during which no signal reaches the recorder, an electrical network excited by the framing pulses to initiate auxiliary pulses which are synchronized with the occurrence of the respective framing pulses, a pulse generator including a normally quiescent multivibrator connected to said attenuating circuit and activated by the trailing edges of the auxiliary pulses to produce corresponding blanking pulses which occur subsequent to the corresponding framing pulses by a chronological interval equal to the period of the auxiliary pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses.

10. An electronic signal blanking circuit for use with a facsimile recorder comprising an amplifier for impressing upon the recorder a facsimile input signal including periodically reoccurring framing pulses such as are used for line synchronizing, said amplifier including means for applying a cut-off potential to one stage thereof during which no signal reaches the recorder, an electrical network excited by the framing pulses to initiate auxiliary pulses which are synchronized with the occurrence of the respective framing pulses, a pulse generator including a normally quiescent multivibrator connected to said attenuating circuit and activated by the trailing edges of the auxiliary pulses to produce corresponding blanking pulses which occur subsequent to the corresponding framing pulses by a chronological interval equal to the period of the auxiliary pulses, said multivibrator having adjustable means for varying the period of the blanking pulses, and an interconnecting circuit between the pulse generator and the amplifier for applying the blanking pulses to the cut-off potential means for the amplifier periodically to cut off the amplifier so that no signal reaches the recorder during a portion of each scanning line whereby the recorder deletes a band of copy whose transverse position with respect to the length of the scanning lines is determined by the period of the auxiliary pulses, the width of the band being fixed by the period of the blanking pulses as determined by the adjustment of the multivibrator.

11. An electronic signal blanking circuit for use with a facsimile recorder having an amplifier including a plurality of stages for impressing upon the recorder a facsimile input signal including periodically reoccurring framing pulses such as are used for scanning line synchronizing, a vacuum tube having an anode and a control grid, a resistor for connecting the anode to a direct power source, said resistor also connecting one stage of the amplifier to the direct power source, means for biasing the grid normally to cut off the tube, an electrical network excited by the framing pulses to initiate auxiliary pulses which are synchronized with the occurrence of the respective framing pulses, a pulse generator connected to said attenuating circuit and activated by the trailing edge of the auxiliary pulses to produce corresponding blanking pulses which occur subsequent to the corresponding framing pulses by a chronological interval equal to the period of the auxiliary pulses, and an interconnecting circuit between the pulse generator and the amplifier for applying the blanking pulses to the grid of the tube to oppose the biasing means so that the tube conducts, the resulting current flow through the resistor causing the succeeding stage of the amplifier to be cut off so that no signal reaches the recorder during a portion of each scanning line whereby the recorder deletes a band of copy whose transverse position with respect to the length of the scanning lines is determined by the period of the auxiliary pulses.

References Cited in the file of this patent

UNITED STATES PATENTS

| | | |
|---|---|---|
| 2,164,297 | Bedford | June 27, 1939 |
| 2,186,742 | White | Jan. 9, 1940 |
| 2,233,881 | Below | Mar. 4, 1941 |
| 2,240,420 | Schnitzer | Apr. 29, 1941 |
| 2,244,239 | Blumlein et al. | June 3, 1941 |
| 2,298,864 | Bartelink | Oct. 13, 1942 |
| 2,548,219 | Jenkins | Apr. 10, 1951 |
| 2,611,819 | Serrell | Sept. 23, 1952 |
| 2,653,186 | Hurford | Sept. 22, 1953 |
| 2,657,258 | Hester | Oct. 27, 1953 |